(12) United States Patent
Hakamada et al.

(10) Patent No.: US 10,438,358 B2
(45) Date of Patent: Oct. 8, 2019

(54) CELL AREA DETERMINATION METHOD, CELL IMAGING SYSTEM, AND CELL IMAGE PROCESSING APPARATUS

(71) Applicants: Sysmex Corporation, Kobe-shi, Hyogo (JP); National University Corporation Tokyo Medical and Dental University, Bunkyo-ku, Tokyo (JP)

(72) Inventors: Kazumi Hakamada, Kobe (JP); Yuki Aihara, Kobe (JP); Masaya Okada, Kobe (JP); Toshiyuki Sato, Kobe (JP); Ichiro Sekiya, Tokyo (JP); Eiji Kobayashi, Wakayama (JP)

(73) Assignees: SYSMEX CORPORATION, Hyogo (JP); NATIONAL UNIVERSITY CORPORATION TOKYO MEDICAL AND DENTAL UNIVERSITY, Tokyo (JP)

( * ) Notice: Subject to any disclaimer, the term of this patent is extended or adjusted under 35 U.S.C. 154(b) by 148 days.

(21) Appl. No.: 15/391,311

(22) Filed: Dec. 27, 2016

(65) Prior Publication Data

US 2017/0186173 A1    Jun. 29, 2017

(30) Foreign Application Priority Data

Dec. 28, 2015    (JP) .................................. 2015-257131

(51) Int. Cl.
| | |
|---|---|
| G06T 7/136 | (2017.01) |
| G06T 7/194 | (2017.01) |
| G06K 9/00 | (2006.01) |
| G06T 7/00 | (2017.01) |

(Continued)

(52) U.S. Cl.
CPC .............. *G06T 7/13* (2017.01); *G06K 9/0014* (2013.01); *G06T 5/50* (2013.01); *G06T 7/136* (2017.01); *G06T 7/174* (2017.01); *G06T 7/194* (2017.01); *G06T 7/90* (2017.01); *G06T 7/97* (2017.01); *G06K 9/00127* (2013.01);
(Continued)

(58) Field of Classification Search
None
See application file for complete search history.

(56) References Cited

U.S. PATENT DOCUMENTS

| 5,097,135 A | * | 3/1992 | Makino | .............. | G01N 21/6428 250/459.1 |
|---|---|---|---|---|---|
| 7,711,174 B2 | | 5/2010 | Sammak et al. | | |

(Continued)

FOREIGN PATENT DOCUMENTS

| EP | 3 086 110 A1 | 10/2016 |
|---|---|---|
| WO | WO 2007/042044 A1 | 4/2007 |

(Continued)

OTHER PUBLICATIONS

JP 2009-198709 machine transltation ; Mar. 9, 2009; Tsukomoto et al.*

(Continued)

*Primary Examiner* — Nancy Bitar
(74) *Attorney, Agent, or Firm* — Brinks Gilson & Lione

(57) ABSTRACT

A method comprises obtaining a first cell image of a cell by a first observation method, obtaining a second cell image of the cell by a second observation method that is different from the first observation method, and determining the region of the cell based on the first cell image and the second cell image.

18 Claims, 14 Drawing Sheets

(51) Int. Cl.
*G06T 7/174* (2017.01)
*G06T 7/13* (2017.01)
*G06T 5/50* (2006.01)
*G06T 7/90* (2017.01)

(52) U.S. Cl.
CPC ............... *G06T 2207/10056* (2013.01); *G06T 2207/10152* (2013.01); *G06T 2207/30024* (2013.01); *G06T 2207/30052* (2013.01); *G06T 2207/30221* (2013.01)

(56) References Cited

U.S. PATENT DOCUMENTS

| | | | | |
|---|---|---|---|---|
| 2008/0052009 | A1* | 2/2008 | Chiu | G01N 21/6428 702/21 |
| 2010/0291575 | A1* | 11/2010 | Shamah | G01N 33/5044 435/6.16 |
| 2015/0279033 | A1 | 10/2015 | Murakami | |
| 2015/0310613 | A1* | 10/2015 | Murakami | G02B 21/365 382/128 |
| 2016/0279033 | A1* | 9/2016 | Moser | C07C 271/28 |
| 2018/0164277 | A1* | 6/2018 | Watanabe | G01N 33/4833 |

FOREIGN PATENT DOCUMENTS

| | | |
|---|---|---|
| WO | WO 2014/088048 A1 | 6/2014 |
| WO | WO 2015/093518 A1 | 6/2015 |

OTHER PUBLICATIONS

Weber et al., "Image Processing for Combined Bright-Field and Reflection Interference Contrast Video Microscopy", *Computer Methods and Programs in Biomedicine*, Elsevier, Amsterdam, NL, vol. 53, No. 2, Jun. 1997, pp. 113-118.

* cited by examiner

CELL AREA DETERMINATION METHOD, CELL IMAGING SYSTEM, AND CELL IMAGE PROCESSING APPARATUS

RELATED APPLICATIONS

This application claims priority from prior Japanese Patent Application No. 2015-257131, filed on Dec. 28, 2015, entitled "CELL REGION DETERMINATION METHOD, CELL IMAGING SYSTEM, CELL IMAGE PROCESSING APPARATUS, AND COMPUTER PROGRAM," the entire contents of which are incorporated herein by reference.

BACKGROUND OF THE INVENTION

1. Field of the Invention

The invention relates to a cell region determination method, cell imaging system, cell image processing apparatus, and computer program.

2. Description of the Related Art

U.S. Pat. No. 7,711,174 discloses a method of determining structural characteristics of a cell by obtaining cell outline and cell texture information from a cell image of a culture process, and analyzing the obtained information.

SUMMARY OF THE INVENTION

The scope of the present invention is defined solely by the scope of the appended claims, and is not affected to any degree by the statements within this summary.

When mechanically determining the characteristics of a cell, it is desirable to be as accurate as possible in differentiating non-cell regions such as background regions and the like from cell regions in the image of cell. The closer the cell region determined from the cell image is to the actual cell shape, the easier it is to determine cell characteristics based on the determined cell region.

However, since cells have no definite shape, and it is not always easy to recognize cells as cells in cell images by mechanical process. In the case of transplant cells in particular, it becomes more difficult to determine the cell region in a cell image inasmuch as there is no marker for recognizing a cell in a cell image since the cell cannot be stained.

Therefore, a new method for determining a cell region from a cell image as accurately as possible is desirable.

First aspect of the invention is a method of determining the region of a cell. The method includes obtaining a first cell image of a cell by a first observation method, obtaining a second cell image of the cell by a second observation method that is different from the first observation method, and determining cell region based on the first cell image and the second cell image.

Second aspect of the invention is a cell imaging system. The cell imaging system includes an imaging part and a processing part. The imaging part is configured to generate a first cell image by imaging a cell using a first observation method, and generate a second cell image by imaging the cell using a second observation method that is different from the first observation method. The processing part is configured to perform image processing. Image processing includes a process to obtain a first cell image from the imaging part, a process to obtain a second cell image from the imaging part, and a process to determine the cell region based on the first cell image and the second cell image.

Third aspect of the invention is a processing apparatus. The processing apparatus has a processing part configured to perform image processing that includes a process to obtain a first cell image of a cell by a first observation method, a process to obtain a second cell image of a cell by a second observation method that is different from the first observation method, and a process to determine the cell region based on the first cell image and the second cell image. Fourth aspect of the invention is a computer program to perform computer-executable image processing.

The invention provides a new method to determine the cell region from a cell image.

DETAILED DESCRIPTION OF THE PREFERRED EMBODIMENTS

1. Cell Imaging System 1.1 Summary

Figure 1A:
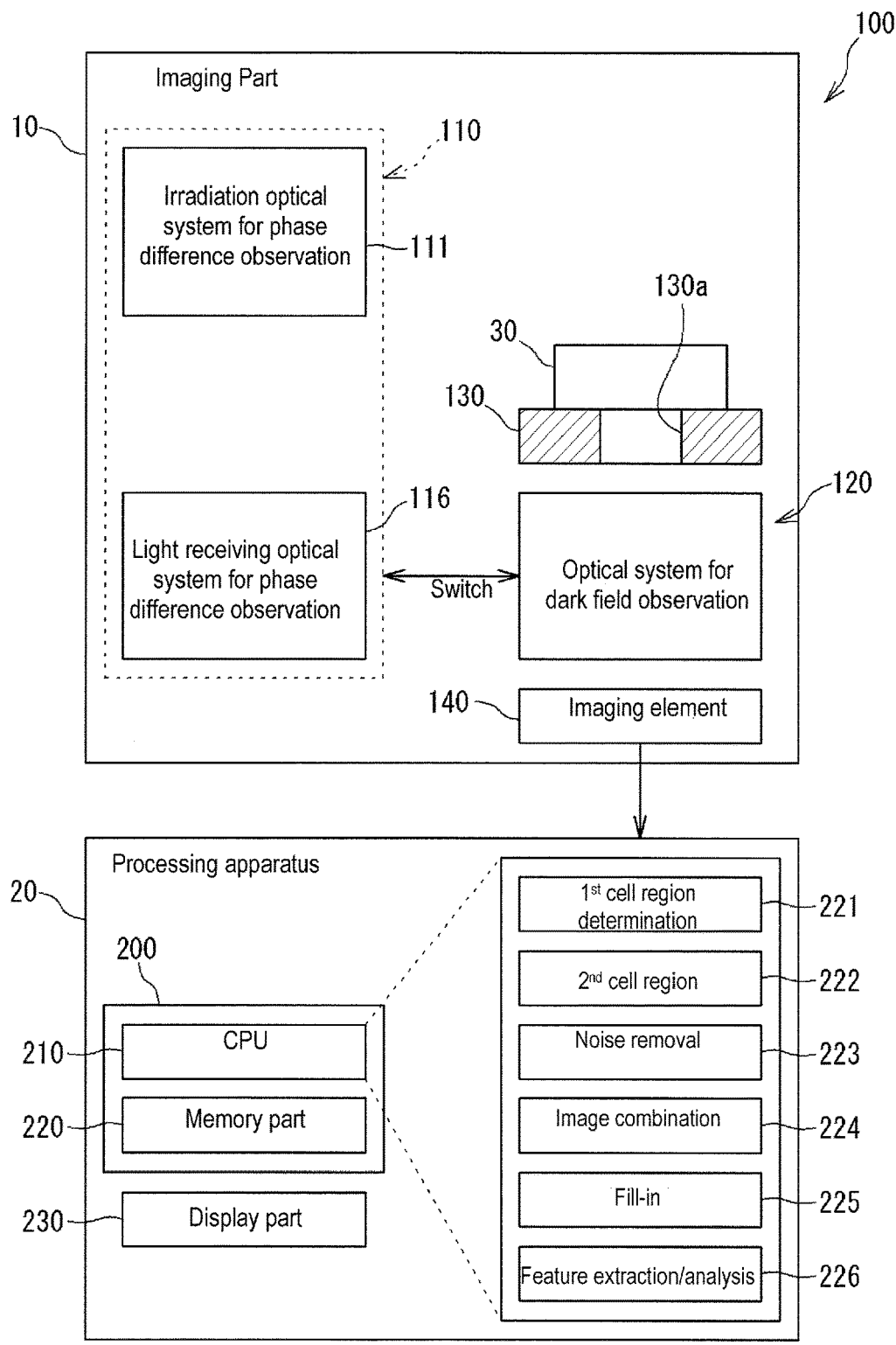
FIG. 1A is a block diagram of a cell imaging system.

The cell imaging system 100 shown in FIG. 1A has an imaging part 10 and processing apparatus 20. The cell imaging system automatically recognizes cell regions in a cell image based on the cell image of the cell. The imaging part 10 images the cell and generates the cell image. The generated cell image is sent to the processing apparatus 20. The processing apparatus 20 processes the cell image.

The cell to be imaged is, for example, a transplantation cell for regenerative medicine. The transplantation cell is, for example, a cultured mesenchymal stem cell (MSC). For example, cells derived from human bone marrow (human bone marrow-derived mesenchymal stem cell) may be used as MSC. Morphological analysis of cultured MSCs is effective for evaluating the condition of MSCs, for example, evaluating transplantation suitability. Cell region determination in cell images is required for morphological analysis of cells.

The cells to be imaged are preferably unstained. Cells cannot be used for transplantation or the cells become damaged when the cells are stained. It is also desirable that the cells are in a sterile condition in the case of transplantation cells. The cells to be imaged are preferably cells sealed in the culture container 30 to maintain the sterile condition. In this case the cell image is obtained by imaging the cells through the culture vessel 30.

The imaging part 10 can produce cell images of several types. The types of cell images are classified according to observation methods for imaging cell images. Differences in observation methods affect how the observation object is viewed, that is, how the form of the cell appears in the cell image. Observation methods include, for example, various observation methods for microscopic observation. Observation methods include, for example, a phase contrast observation method, a dark field observation method, a dark field observation method, and a differential interference observation method. When classifying cell images according to the observation method, cell images are classified into; for example, phase difference images, dark field images, dark field images, and differential interference images. The phase difference image is a captured image based on a phase difference observation method utilizing the phase difference of light passing through cells that are the observation object. In the phase difference image, there is a phase difference image of dark contrast in which the inside of the observation object appears dark and the vicinity of the outline looks bright, and a phase difference image of bright contrast where the inside of the observation object appears bright and the vicinity of the outline appears dark. The dark field image is a captured image based on a dark field observation method for observing scattered light from the cells being observed. The bright field image is a captured image based on the bright field observation method in which the transmitted light intensity according to the difference in the light absorption rate in the cell being observed is reflected as contrast in the image. A differential interference image is an image captured based on a differential interference observation method making use of the polarization property and coherence of light. The observation is performed using different optical systems in each of the observation methods. Note that the types of cell images are not limited to those described above.

Even in the case of the same cell, when observed by different observation methods, the appearance of the cell is different. For example, in a phase difference image, the vicinity of the outline of the cell becomes brighter, and the vicinity of the cell center may become darker the larger the cell. In a dark field image, the scattered light becomes strong and bright since light tends to be scattered at places such as near the nucleus of the cell. In a bright field image, contrary to the dark field image, light is transmitted with difficulty in the vicinity of the nucleus of the cell or the like, so the transmitted light becomes weaker and darker. A differential interference image is an image having a stereoscopic effect.

As described above, in a plurality of cell images captured based on different observation methods, how cell images appear in the images differs even when the same cell is imaged. Using this point, the cell imaging system 100 determines a cell region using a plurality of cell images captured by different observation methods.

Although two types of cell images are used below as a plurality of cell images with different observation methods below, three or more types of cell images also may be used. For example, a combination of any one of a phase difference image and a dark field image, a phase difference image and a bright field image, a phase difference image and a differential interference image, a dark field image and a bright field image, a dark field image and a differential interference image, and a bright-field image and a differential interference image can be adopted as combinations of two types of cell images.

A combination of one of the following: a phase difference image, dark field image and bright field image, a phase difference image, dark field image and differential interference image, a phase difference image, bright field image and differential interference image, a dark field image, bright-field image and differential interference image can be used as a combination of three types of cell images. A combination of four types of cell images, for example, a combination of a phase contrast image, a dark field image, a bright field image, and a differential interference image, can be adopted as a combination of four types of cell images. For each combination described above, a dark contrast phase difference image, or a bright contrast phase difference image, may be used as the phase difference image. For each combination described above, both a dark contrast phase difference image and a bright contrast phase difference image may be used as two types of phase difference image.

A case in which a phase contrast image and a dark field image are used as a combination of two types of cell images is described below. A dark contrast phase difference image is adopted as the phase difference image. In the following, the phase difference observation method will be referred to as a first observation method and the dark field observation method will be referred to as a second observation method as necessary. A phase difference image obtained by imaging cells with the first observation method is referred to as a first cell image and a dark field image obtained by imaging cells with a second observation method is referred to as a second cell image.

1.2 Imaging Part

The imaging part 10 images the cells by the phase contrast observation method, that is, the first observation method to generate a first cell image, and the same cell is imaged by the second observation method which is a dark field observation method to obtain a second cell image. The imaging part 10 includes an installation part 130 for installing the observation object, and an imaging element 140 for imaging the observation object. The installation part 130 is configured, for example, as a stage that supports the cell culture container 30 from below. The imaging element 140 is configured, for example, by a CCD image sensor for capturing a color image. The imaging element 140 is arranged below the installation part 130.

Figure 1B:
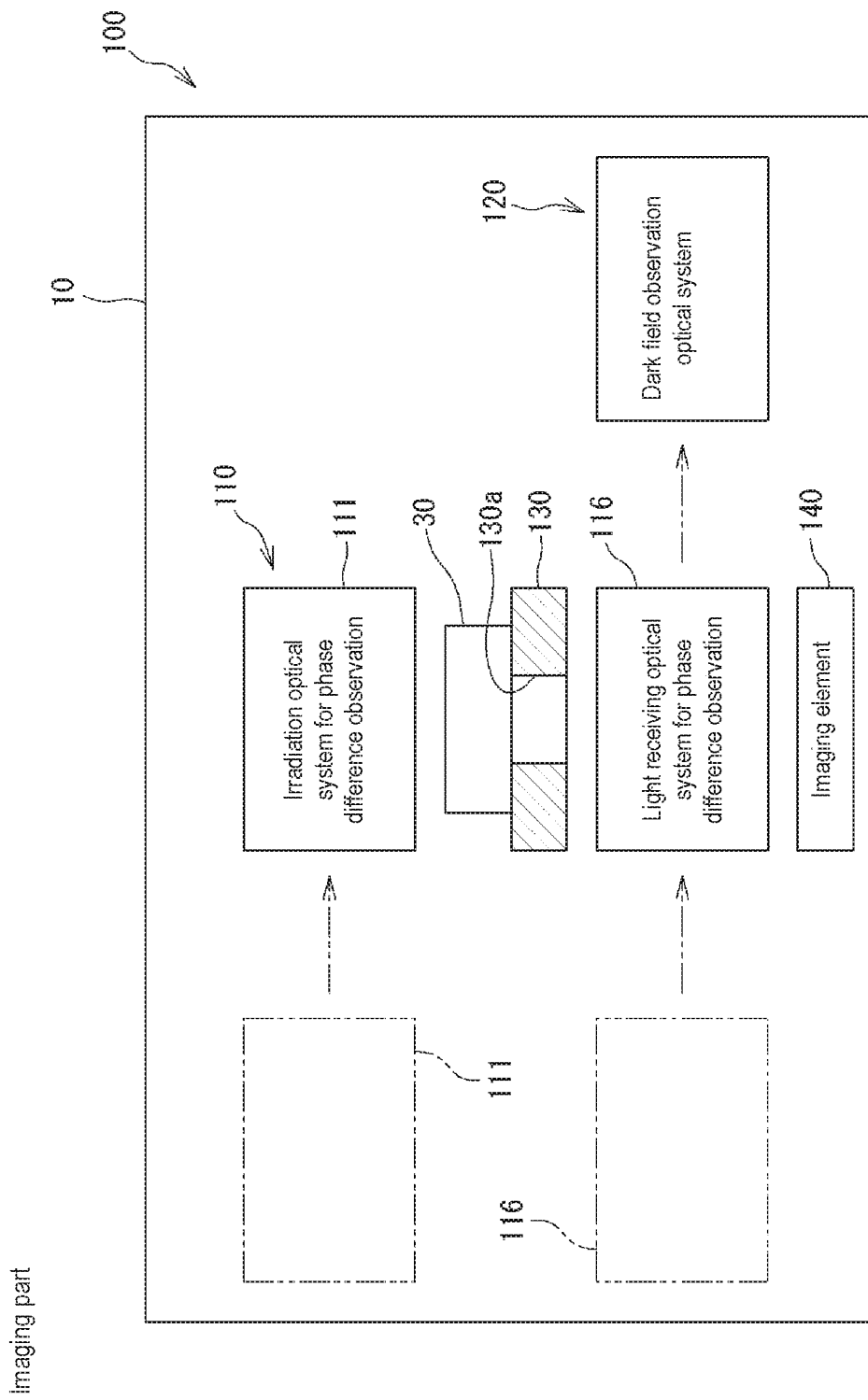
FIG. 1B is a block diagram of the cell imaging system after switching.

The imaging part 10 has a first optical system 110, and a second optical system 120. The first optical system 110 is an optical system used for phase difference observation. The second optical system 120 is an optical system used for dark field observation. When an observation object is installed in the installation part 130, the plurality of optical systems 110 and 120 can be selectively switched. That is, switching occurs to move the first optical system 110 to the position of the installation part when capturing the first cell image, as shown in FIG. 1B, and switching occurs to move the second optical system 120 to the position of the installation part 130 when capturing the second cell image as shown in FIG. 1A. The switching of the optical systems 110 and 120 to be used in imaging may be accomplished manually, or automatically under the control of the processing part 200.

Figure 2A:
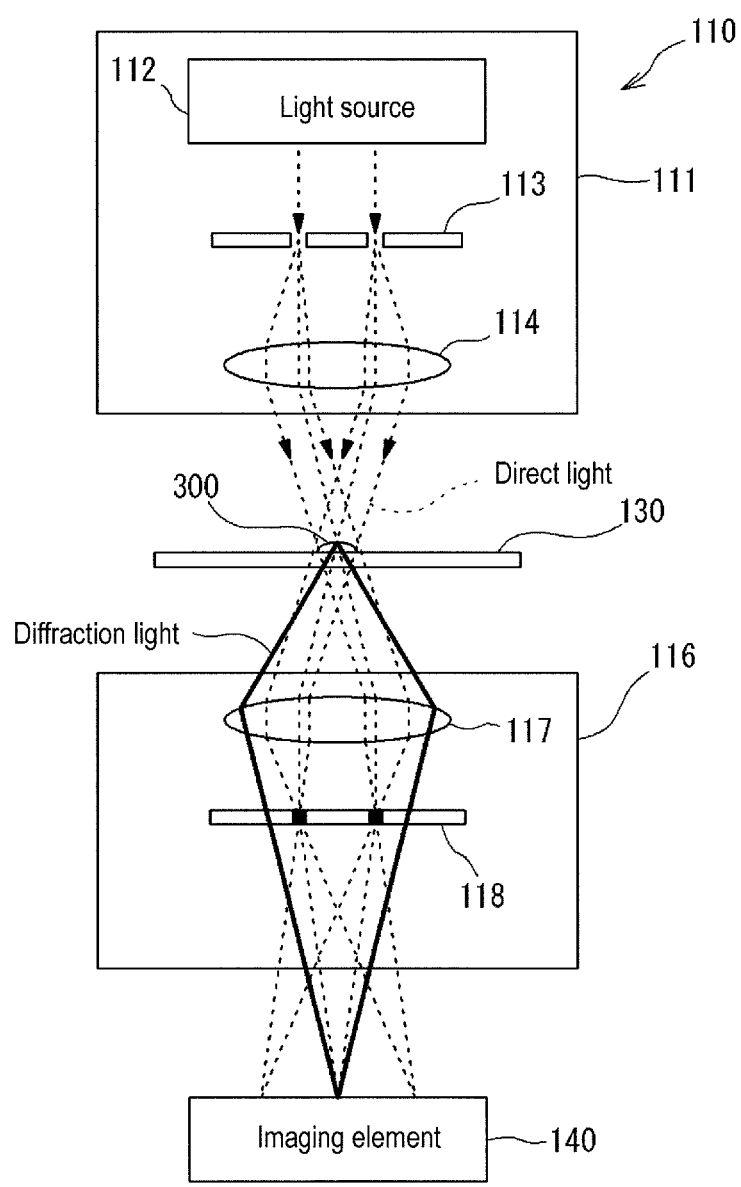
FIG. 2A shows a first optical system for phase difference observation.

As shown in FIG. 2A, the first optical system 110 that is used for phase difference observation includes an irradiation optical system 111 and a light receiving optical system 116. When capturing the phase difference image, the irradiation optical system 111 is arranged above the installation part 130 to illuminate the observation object 30 from above, and the light receiving optical system 116 is arranged below the installation part 130 to receive the light from the observation object. The irradiation optical system 111 includes a light source 112, phase ring 113, and condenser lens 114. The light receiving optical system 116 has an objective lens 117 and phase plate 118. Note that in FIG. 2A the installation part 130 and the observation object 30 are drawn in simplified manner.

The light from the light source 112 is focused by the phase ring 113, passes through the condenser lens 114, and reaches the observation object 300. The light that passes through the observation object 300 is divided into direct light and diffracted light. The diffracted light is generated at a part having a different refractive index in the observation target 300. The diffracted light produced in the observation object 300 is phase delayed by about ¼ wavelength with respect to direct light. The direct light and diffracted light pass through the objective lens 117 and phase plate 118, respectively, and reach the imaging element 140. The direct light that passes through the observation object 300 is collected by the objective lens 117, and the phase is shifted ¼ wavelength in the phase plate 118. The phase of the direct light is advanced, for example, by a ¼ wavelength in the phase plate 118. As a result, the phase difference between the direct light and the diffracted light becomes ½ wavelength, and in the portion where the direct light and the diffracted light interfere with each other, the direct light is weakened due to interference with the diffracted light and becomes darker. Since the direct light and the diffracted light interfere with each other inside the observation object 300, the inside of the observation target 300 appears to be darker than the background portion in the dark contrast phase difference image. A bright edge called a halo occurs in the outline of the observation object 300. Therefore, the observation object 300 is an image in which the outline of the observation object is bright. Note that a light absorbing neutral density (ND) filter is provided in the phase plate 118 to further reduce the intensity of the direct light. The interior of the observation object 300 is further darkened and contrast is increased by the provision of the ND filter. The provision of the ND filter is particularly useful when the intensity of the light from the light source 112, for example, laser light, is strong.

Figure 2B:
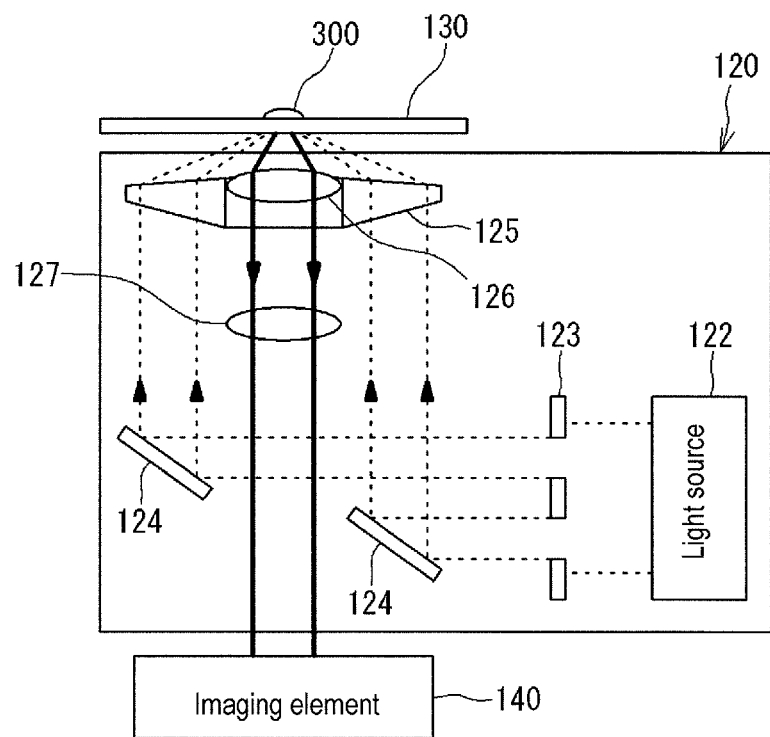
FIG. 2B shows a second optical system for dark field observation.

As shown in FIG. 2B, the second optical system 120 that is used for dark field observation includes an irradiation optical system and a light receiving optical system. In the embodiment, the irradiation optical system and the light receiving optical system are integrally provided and arranged below the installation part 130. The second optical system 120 includes a light source 122, ring-shaped diaphragm 123, ring-shaped mirror 124, and ring-shaped condenser lens 125 as the irradiation optical system. The second optical system 120 has objective lenses 126 and 127 as the light receiving optical system.

When capturing a dark field image, the irradiation optical system irradiates light from below the observation object, that is, from the bottom side of the culture container 30. That is, the light from the light source 122 becomes a ring-shaped light flux by the ring-shaped diaphragm 123, then is reflected to the observation object side by the ring-shaped mirror 124, passes through the ring-shaped condenser lens 125, and reaches the observation object.

The light receiving optical system receives the scattered light from below the observation object, that is, from the observation object at the bottom side of the culture container 30. That is, the scattered light from the observation object passes through the objective lenses 126 and 127 and arrives at the imaging element 140. The scattered light becomes stronger at places such as near the nucleus of the cell. The dark field image therefore is an image that is bright near the center of the cell.

Figure 3:
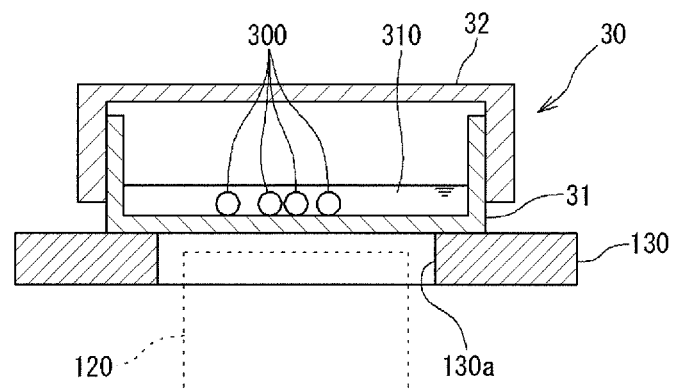
FIG. 3 shows the installation part and the culture container.

As shown in FIG. 3, a vertical through hole 130a is formed in the installation part 130 to allow imaging by the imaging element 140 from below. Note that the installation part 130 also may permit light transmission from below, for example, the installation part 130 may be formed partially or entirely of part or the entirety of transparent material.

The culture container 30 to be installed in the installation part 130 is formed of transparent material, and preferably can be sealed to maintain the internal sterile condition. The culture container 30 shown in FIG. 3 has a container body 31 which has an opening at the top, and a cover 32 to seal the top opening. The observation object cell and culture medium 310 are present within the container body 31. The culture medium 310 is preferably liquid.

If an attempt to image the cells is made while maintaining the sterile condition, the lid 32 of the culture container 30 cannot be removed at the time of imaging. Therefore, if the lenses 125, 126 are arranged above the culture container 30, the lenses 125, 126 cannot be positioned below the lid 32 due to the interference of the lid 32. The lenses 125 and 126 therefore may not be sufficiently close to the cell 300 in some cases. If the lenses 125 and 126 cannot be brought sufficiently close to the cell 300, a clear image cannot be captured in some cases depending on conditions. On the other hand, when the lenses 125 and 126 are arranged on the bottom side of the culture container 30, interference by the lid 32 does not cause a problem. Moreover, when the through hole 130a is formed in the installation part 130, the lenses 125 and 126 can be brought closer to cell 30 by moving the condenser lens 125 which is the irradiation optical system and the objective lens 126 which is the light receiving optical system into the through hole 130a.

1.3 Processing Apparatus

The processing apparatus 20 is configured by a computer. As shown in FIG. 1A, the processing apparatus 20 has a processing part 200. The processing part 200 is configured by a CPU 210 and memory part 220. A computer program that is executed by the CPU 210 is stored in the memory part 220. The processing part 200 performs at least the process shown in FIG. 4 via the execution of the computer program. The processing part 20 also may have a display part 230 and input part and the like.

The process executed by the processing part 200 includes image processing of the cell images. The image processing includes determining the cell region, which is the region in which a cell is present, in the cell image. The processing part 200 also can perform analysis processing using the image obtained as a result of the image processing. Analysis processing includes, for example, analysis of the cell based on feature quantity extraction and feature quantity of the cell. The processing part 200 also can perform the control of the imaging part 10. The processing part 200 can display the image obtained as a result of the image processing, and results of the analysis processing on the display part 230.

The processing part 200 performs image processing based on the cell images generated by the imaging part 10. However, the cell image to be processed may be, for example, a cell image transmitted via a network and stored in the memory part 220, or may be a cell image stored in the memory part 220 via a portable storage medium.

In the embodiment, the processing performed by the processing part 200 includes a first cell region determining process 221, a second cell region determining process 222, a noise removal process 223, an image combining process 224, a fill-in process 225, a feature extraction/analysis process 226. These processes are described below based on FIG. 4.

2. Processes Performed by the Processing Part

Figure 4:
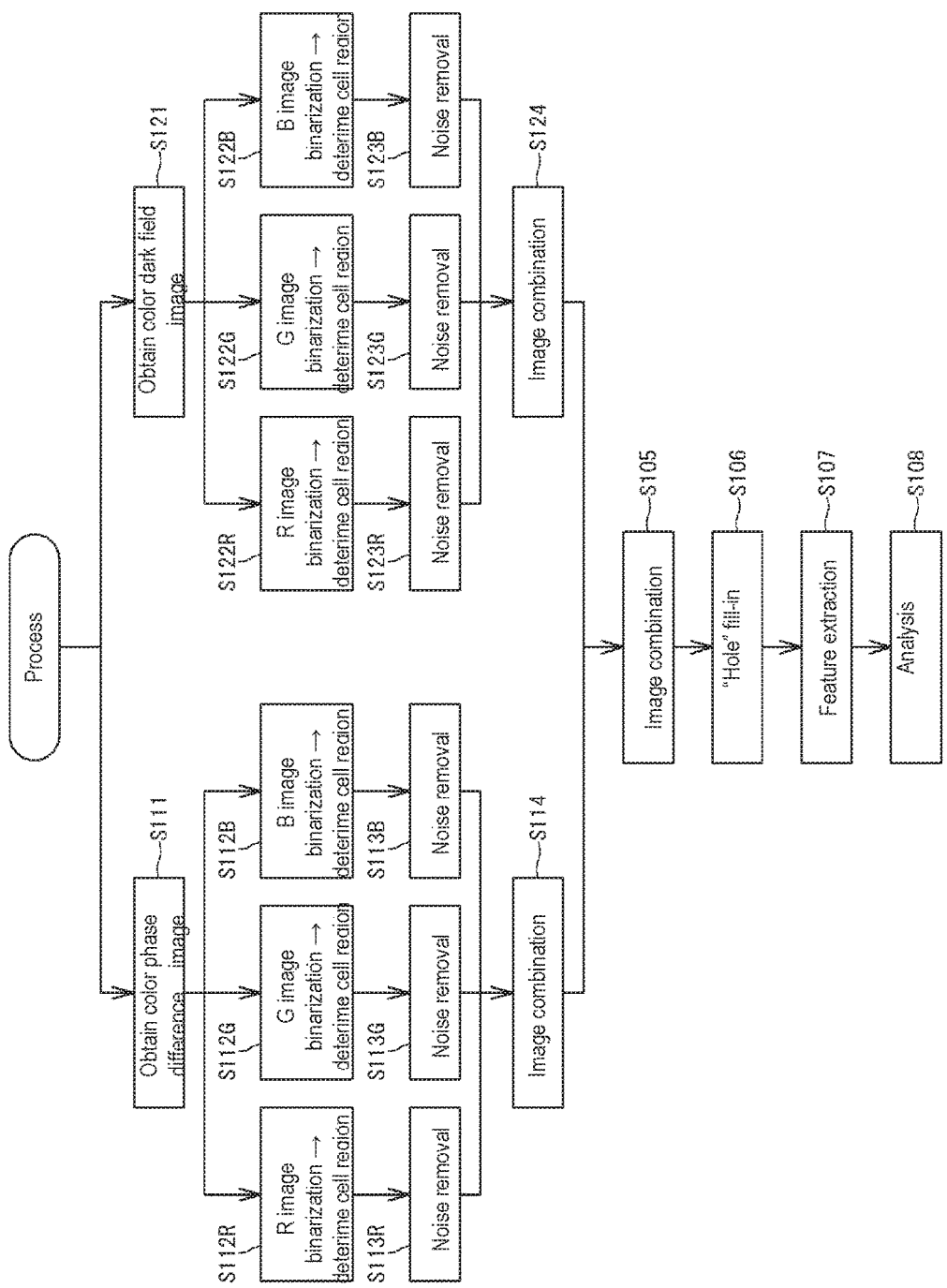
FIG. 4 is a flow chart of the processing performed by the processing apparatus.

As shown in FIG. 4, the processing part 200 obtains the first cell image, which is a phase difference image, from the imaging part 10 in step S111. The processing part 200 obtains the second cell image, which is a dark field image, from the imaging part 10 in step S121. The processing part 200 stores the obtained cell images in the memory part 220. Either step S111 or step S121 may be performed first.

Figure 5:
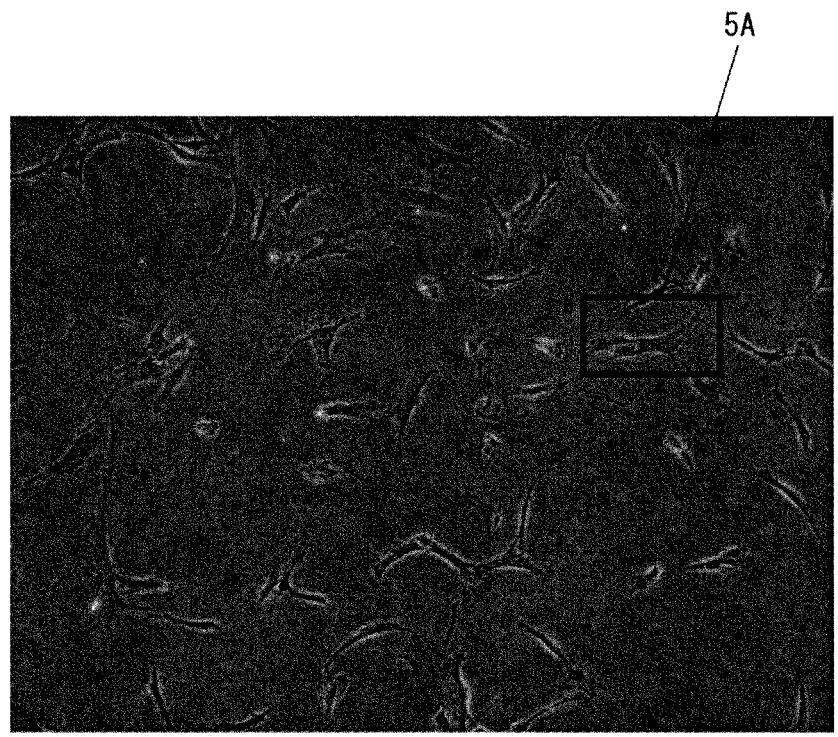
FIG. 5 cell phase difference image.
Figure 6:
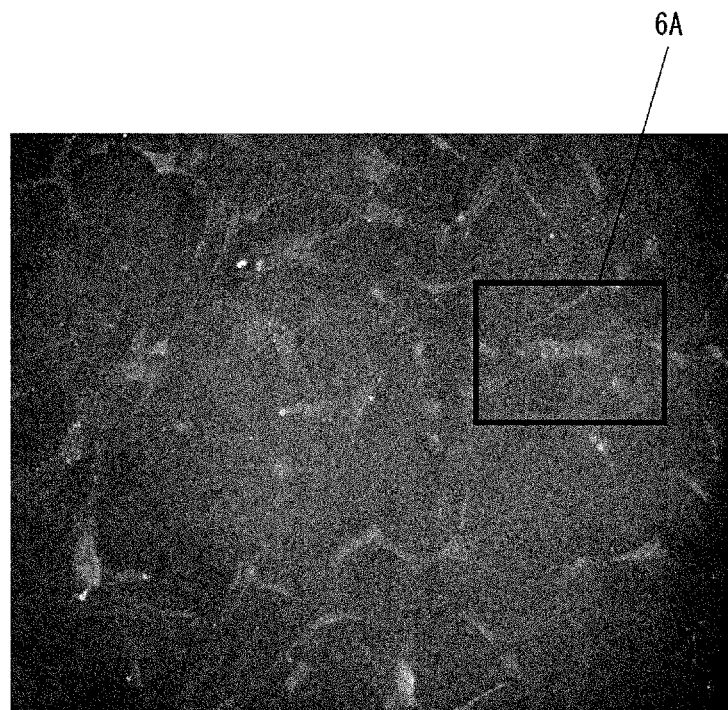
FIG. 6 is a cell dark field image.

FIG. 5 shows an example of a first cell image, and FIG. 6 shows an example of a second cell image. Although FIGS. 5 and 6 are monochrome images for convenience of display as a drawing, the first cell image and the second cell image are color images according to the embodiment.

The processing part 200 performs image processing of the first cell image, and image processing of the second cell image. Image processing of either of the images may be performed first.

In steps S112R, S112G, and S112B, the processing part 200 performs the first process, that is, the first cell region determining process 221, as the image processing on the first cell image. In the first cell region determining process 221, a first cell region that is a cell region in the first cell image is determined. Cell region determination in the first cell image is accomplished, for example, by an image binarization process.

The first cell region determining process 221 is performed for each of the red image (R image), the green image (G image), and the blue image (B image) constituting the color first cell image. That is, binarization processing is performed on the R image in step S112R, binarization processing is performed on the G image in step S112G, and binarization processing is performed on the B image in step S112B. Either step S112R, S112G or S112B may be performed first.

In steps S112R, S112G, and S112B, binarization processing is performed using two threshold values relating to pixel luminance, respectively. The two threshold values region first threshold value, and a second threshold value that is less than the first threshold value. The first threshold value is used for extracting a bright portion in the vicinity of the outline as a cell region by utilizing the fact that the vicinity of the outline of the cell becomes brighter in the phase difference image. The second threshold value is used to extract a dark portion near the center of the cell by utilizing the fact that the center of the cell becomes dark in the phase difference image. The use of two threshold values in the first cell image, which is the phase difference image, is because the cell image mainly consists of a part that is brighter than the background region, and a dark part.

In the binarization process of the first cell image, a region where the degree of brightness is higher than the first threshold value and a region where the degree of brightness is lower than the second threshold value respectively correspond to values (for example, "1") indicating the first cell region in each of the RGB images. On the other hand, the region having a degree of brightness between the first threshold value and the second threshold value will have a value (for example, "0") indicating a non-cell region. Note that the non-cell region is typically the region in which the culture medium 310 is imaged.

The first threshold value and the second threshold value can be determined by statistical processing of the degree of brightness in each RGB image constituting the first cell image. The statistical processing includes, for example, obtaining an average value $\mu1$ and a standard deviation $\sigma1$ of the brightness of the pixels constituting each image. For example, $\mu1+2\sigma1$ can be used as the first threshold value, and $\mu1-2\sigma1$ can be used as the second threshold value. Since the statistical processing is performed independently for each of the RGB images, the values of the first threshold value and the second threshold value are independently determined in each of the RGB images. Therefore, the two threshold values are appropriate for each RGB image.

The first cell region determined by binarization processing includes numerous first noise regions that are not true cell regions. In steps S113R, S113G, and S113B, the processing part 200 performs the noise removal process 223 on each of the binarized RGB images. The noise removal process 223 identifies the first noise regions included in the first cell region based on the size of the region, and removes a relatively small first noise region from the first cell region. Statistical processing of the area of the first cell region in the binarized image is used for the removal of a relatively small noise region.

Figure 7:
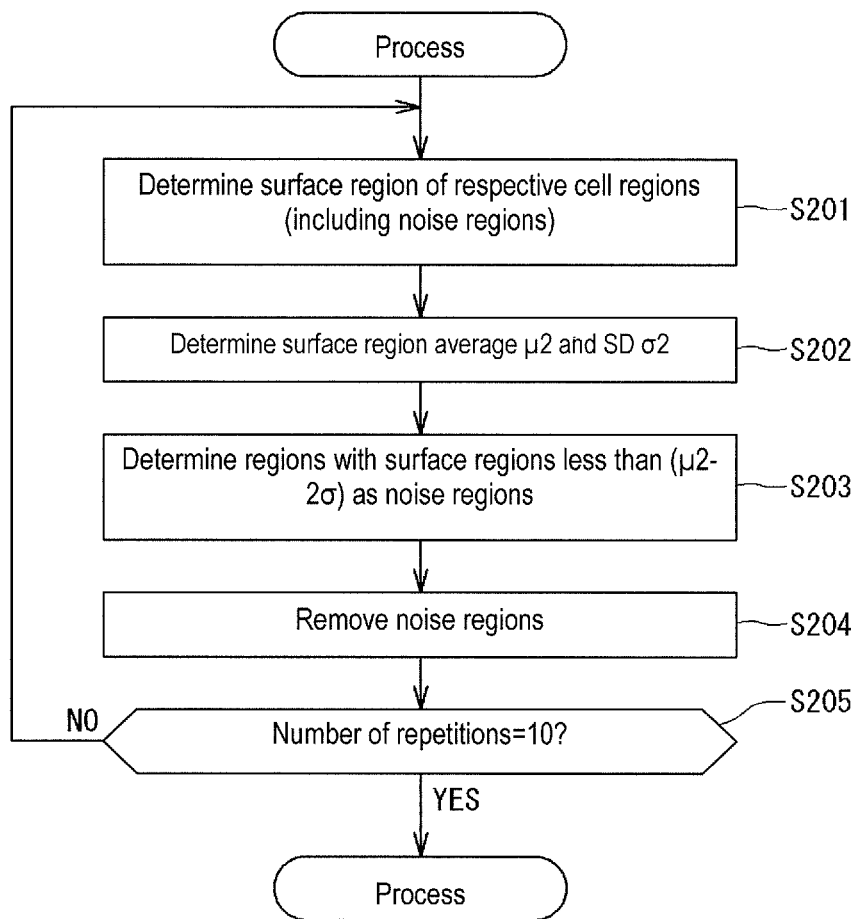
FIG. 7 is a flow chart of the noise removal process.

As shown in FIG. 7, in order to remove noise, the processing part 200 calculates the area of each of the plurality of first cell regions in the binarized image in step S201. In step S202, the processing part 200 obtains an average value $\mu2$ and a standard deviation $\sigma2$ for the area. In step S203, the processing part 200 identifies a region having an area smaller than a threshold value (noise identification threshold value) for identifying a noise region in the first cell region as a noise region. The threshold value for noise identification is determined, for example, as $\mu2-2\sigma2$. In step S204, the processing part 220 removes the noise region from the first cell region. The removal of the noise region from, for example, a binarized image, the brightness value of the noise region may be set to a value (for example, "0") indicating a non-cell region.

As is clear from the repetition condition of step S205, the processing from step S201 to step S204 is repeated a plurality of times (for example, 10 times). The average value $\mu2$ and the standard deviation $\sigma2$ are recalculated, and the noise identification threshold value is re-determined for each repetition. For this reason, the noise region is reduced with each repetition.

The identification accuracy of the noise region is improved since the noise removal process 223 is separately performed for each of the binarized RGB images in steps S113R, S113G, S113B. That is, in the true cell region, the light and shade vary in common with each of the RGB colors, whereas the noise region tends to occur independently in each color of RGB. For this reason, it is easy to distinguish the noise region in each of the RGB images, the noise region is subdivided, and the noise region can be easily identified based on the size of the region.

In step S114, the processing part 200 combines the binarized RGB images from which the noise has been removed. The combination is performed by superimposing each binarized RGB image. The superimposition is performed, for example, by setting a pixel which has a value (for example, "1") indicating the first cell region in any of the binarized RGB images as a value indicating the first cell region in the composite image, and other pixels may be set to a value (for example, "0") indicating a non-cell region.

The processing part 200 performs the same image processing as the processing on the first cell image for the second cell image which is the dark field image. In steps S112R, S112G, and S112B, the processing part 200 performs the second process, that is, the second cell region determining process 222, as the image processing on the second cell image. In the first cell region determining process 222, a second cell region that is a cell region in the second cell image is determined. Cell region determination in the second cell image is accomplished, for example, by an image binarization process. The second cell region determining process 222 also is performed for each of the red image (R image), the green image (G image), and the blue image (B image) constituting the color second cell image.

In steps S123R, S123G, and S123B, the processing part 200 performs the noise removal process 223 on each of the binarized RGB images. The noise removal process 223 is performed for each of the RGB images in the procedure shown in FIG. 7. In step S124, the processing part 200 combines the binarized RGB images from which the noise has been removed. The combination is performed by superimposing each binarized RGB image. The superimposition is performed, for example, by setting a pixel which has a value (for example, "1") indicating the first cell region in any of the binarized RGB images as a value indicating the first cell region in the composite image, and other pixels may be set to a value (for example, "0") indicating a non-cell region.

The details of the image processing on the second cell image are the same as the image processing on the first cell image except for the threshold value for binarization. The binarization of the second cell image in steps S122R, S122G, and S122B is performed by a single third threshold value related to the degree of brightness of the pixel. As shown in FIG. 6, the third threshold value is for extracting a bright part as a cell region by utilizing the fact that the cell image becomes brighter in the dark field image.

In the binarization process of the second cell image, a region where the degree of brightness is higher than the third threshold value corresponds to a value (for example, "1") indicating the second cell region in each of the RGB images. On the other hand, a region having a lower degree of brightness than the third threshold value corresponds to a value (for example, "0") indicating a non-cell region.

The third threshold value can be determined by statistical processing of the degree of brightness in each RGB image constituting the second cell image. The statistical processing includes, for example, obtaining an average value $\mu1$ and a standard deviation $\sigma1$ of the brightness of the pixels constituting each image. For example, $\mu1+2\sigma1$ can be used as the third threshold value. Since the statistical processing is performed independently for each of the RGB images, the value of the third threshold value is independently determined in each of the RGB images. Therefore, the third threshold value is appropriate for each RGB image. Since the third threshold value is determined separately from the first threshold value and the second threshold value for the first cell image, it is a threshold value suitable for the second cell image.

In step S105, the processing part 200 performs an image combining process 224 as a third process. In the image combining process 224, a composite image is generated by superimposing the first cell region in the image obtained in step S114 and the second cell region in the image obtained in step S124. In the composite image generated in step S105, an image expressing a synthetic cell region obtained by superimposing the first cell region and the second cell region. The composite cell region is composed of a region belonging to at least one of the first cell region and the second cell region. In the composite image, for example, the value of the pixels included in the composite cell region is "1", and the value of the pixels included in the region other than the composite cell region is "0".

The processing part 200 performs the filling-in process 225 in step S106. In the fill-in process 224, there may be a part in a single composite cell region that has a value indicating a region other than the composite cell region. Such a part is called "hole" in image processing. The fill-in process 225 eliminates holes. The value of the pixel corresponding to the hole becomes a value indicating the composite cell region through the fill-in process 225. The filling-in process 225 can be performed, for example, by morphological processing. Utilizing morphological processing, filling in the composite cell region is performed by expansion and contraction of the composite cell region.

In step S107, the processing part 200 extracts the feature amount of the imaged cell. The extraction of the feature amount is performed based on the composite image after the processing in step S106. The feature amount is, for example, cell size, peripheral length, average diameter, maximum diameter, minimum diameter. In step S108, the processing part 200 analyzes the imaged cell. Analysis includes morphological analysis based on the cell feature amount. Analysis may include assessment of cell differentiation. The analysis of the cells also may include counting the number of cells in the composite image, that is, the number of composite cell regions.

Figure 8:
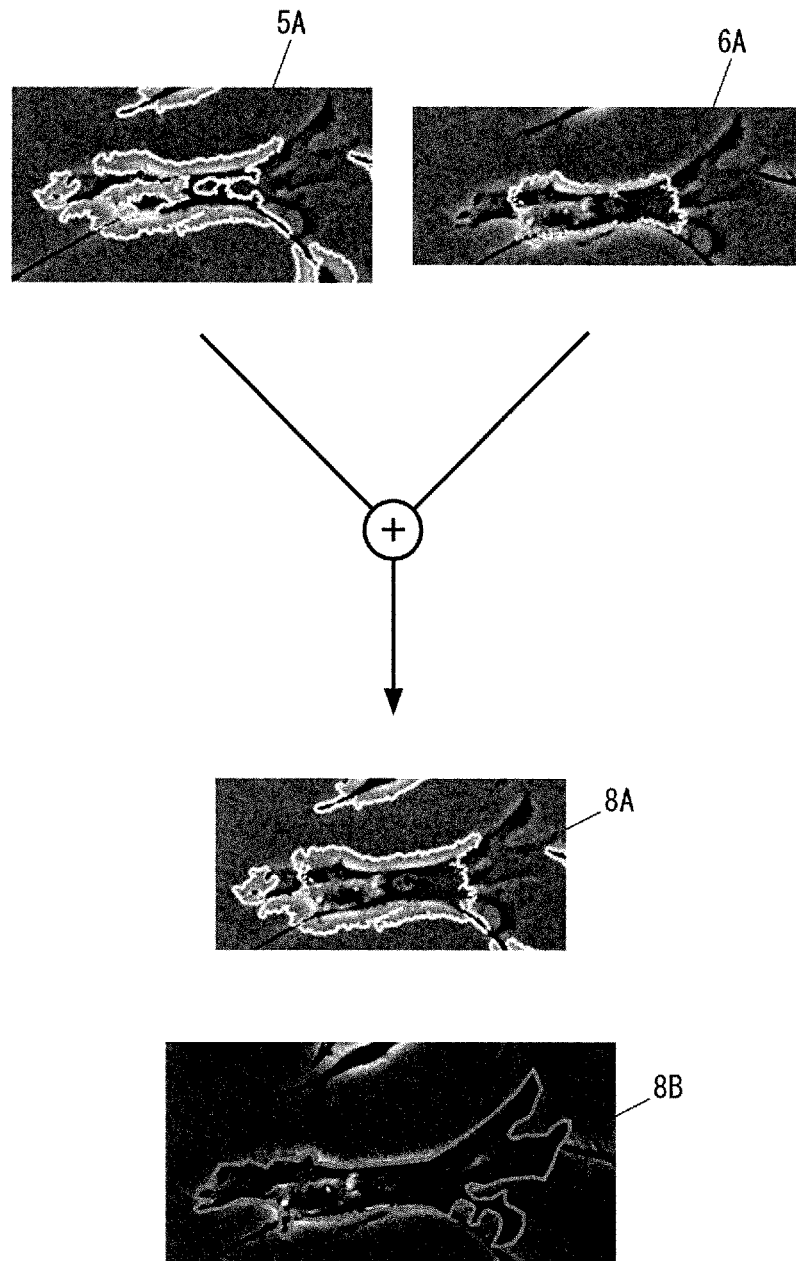
FIG. 8 shows the cell region by automatic recognition and the cell region by visual recognition.

FIG. 8 shows a composite image 8A generated from the first cell image shown in FIG. 5 and the second cell image shown in FIG. 6 by the processing unit 200. In FIG. 8, the region of interest 5A in the first cell image shown in FIG. 5 and the region of interest 6A in the second cell image shown in FIG. 6 are shown enlarged. Note that the region of interest 5A and the region of interest 6A are areas in which the same cells are imaged. The composite image 8A represents a composite cell region obtained by superimposing the first cell region in the region of interest 5A and the second cell region in the region of interest 6A.

Regarding the region of interest 5A, the outline of the first cell region determined by the processing up to step S114 on the first cell image is indicated by a white line in FIG. 8. Similarly, regarding the region of interest 5A, the outline of the second cell region determined by the processing up to step S124 on the second cell image is indicated by a white line. Regarding the composite image 8A, the outline of the composite cell region determined by the image combination up to step S105 is indicated by a white line. For reference, a reference image 8B showing the cell outline determined manually by visual observation is shown in FIG. 8.

Figure 9A:
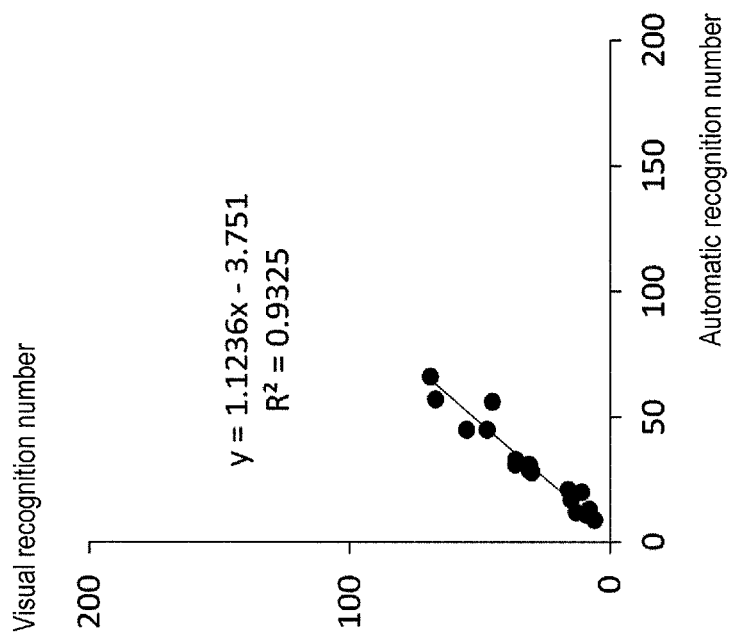
FIGS. 9A and 9B show the number of cell regions by automatic recognition and the number of cell regions by visual recognition.

In the first cell image which is the phase difference image, the outline shape along the longitudinal direction of the elongated cell tends to appear as the first cell region, whereas segmentation of the first cell region readily occurs in the width direction of the cell, as is clear from the region of interest 5A. Therefore, in practice, there is a high possibility that the processing part 200 recognizes a plurality of segmented first cell regions although it is a single cell. FIG. 9A shows the correspondence between the number (automatic recognition number) of first cell regions counted from the first cell image by the processing part 200, and the number (visual recognition number) of cells counted by visual observation of the first cell image. As shown in FIG. 9A, the automatic recognition number tends to be larger than the visual recognition number in the case of the first cell image which is a phase difference image. In this way, when a cell region is determined based on a phase difference image, there is concern that one actually will be recognized as a plurality of segmented first cell regions, and the estimated number of cells will be high.

Figure 9B:
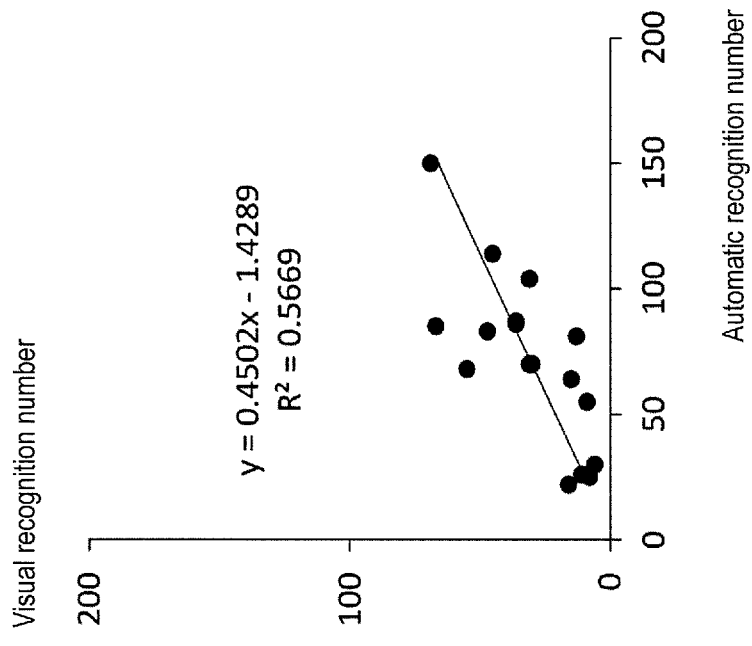

In the second cell image which is a dark field image, although the vicinity of the center of the cell is recognized as the second cell region, the shape of the cell in the longitudinal direction is easily lost in the second cell region, as is clear from the region of interest 6A. Information on the shape of the whole cell is therefore liable to be lost from the second cell region. On the other hand, the second cell image which is a dark field image is suitable for automatic recognition of the number of cells. FIG. 9B shows the correspondence between the number (automatic recognition number) of second cell regions counted from the second cell image by the processing part 200, and the number (visual recognition number) of cells counted by visual observation of the second cell image. As shown in FIG. 9B, in the case of the second cell image which is a dark field image, the correlation between the automatic recognition number and the visual recognition number is high and it is suitable for an accurate understanding of the number of cells.

Therefore, in the composite cell region created by superimposing the second cell region that tends not to have region segmentation on the first cell region that easily preserves the information on the shape of the whole cell, the location of segmented regions in the first cell region are connected by the second cell region, as shown in the composite image of FIG. 8A. The cell outline in the composite image 8A is closer to the outline in the reference image 8B by visual observation than the cell outline in the regions of interest 5A and 6A, and it can be seen that the cell region can be determined more appropriately.

Figure 10:
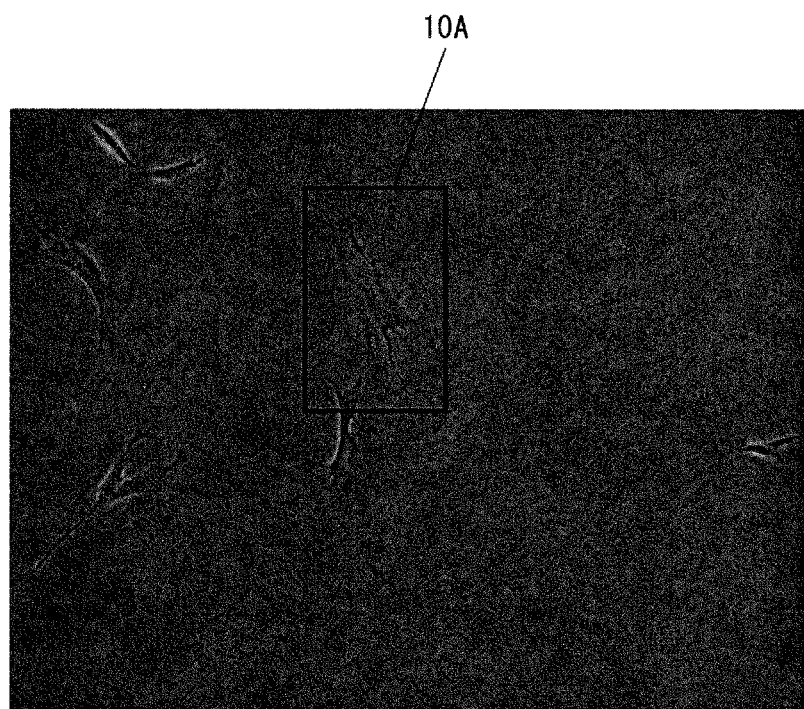
FIG. 10 is the cell phase difference image.
Figure 11:
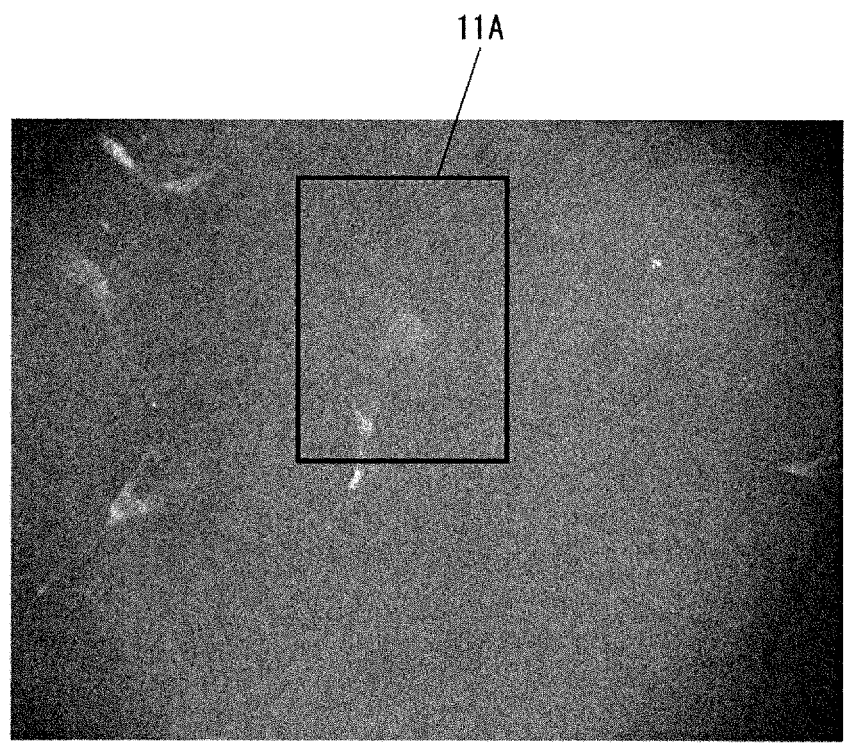
FIG. 11 is a cell dark field image.
Figure 12:
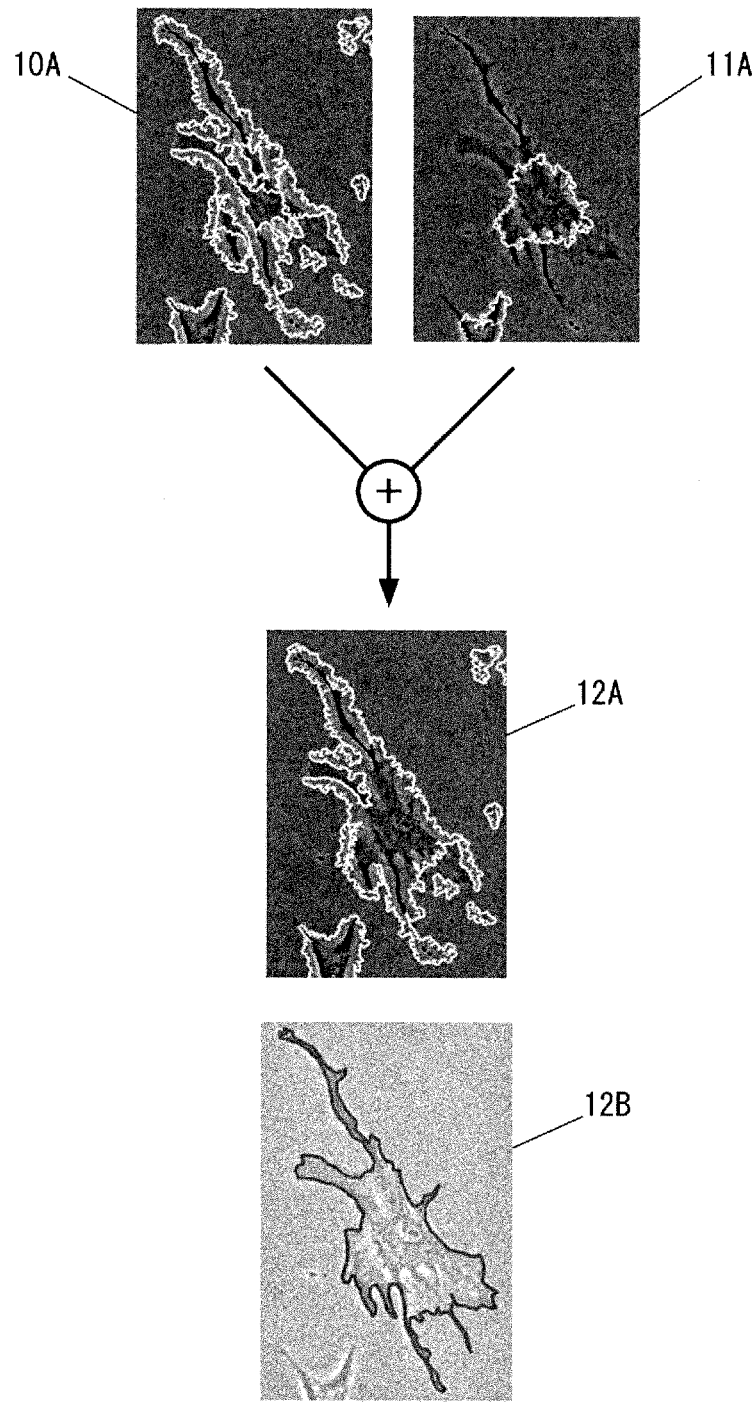
FIG. 12 shows the cell region by mechanical recognition and the cell region by visual recognition.

FIG. 10 shows a phase difference image (first cell image) different from FIG. 5, and FIG. 11 shows a dark field image (second cell image) different from FIG. 6. FIG. 10 and FIG. 11 are images of the same cells. FIG. 12 shows a composite image 12A and a reference image 12B generated from the region of interest 10A in FIG. 10 and the region of interest 1A in FIG. 11.

Regarding the region of interest 10A, the outline of the first cell region determined by the processing up to step S114 on the first cell image is indicated by a white line in FIG. 12. Similarly, regarding the region of interest 11A, the outline of the second cell region determined by the processing up to step S124 on the second cell image is indicated by a white line. Regarding the composite image 12A, the outline of the composite cell region determined by the image combination up to step S105 is indicated by a white line. For the reference image 12B, the cell outline determined manually by visual observation is indicated by black lines.

The cell outline in the composite image 12A is closer to the outline in the reference image 12B by visual observation than the cell outline in the regions of interest 10A and 11B, and it is understood that the cell region can be determined more appropriately.

In this way, when a cell region is determined based on a plurality of cell images captured based on different observation methods such as a phase contrast image and a dark field image, it is possible to more appropriately determine the cell region compared with a case where a cell are is determined based on one cell image, since complementation by a cell region determined based on the other cell image will be performed. This point is not limited to a case where a phase difference image and a dark field image are used as a plurality of cells, inasmuch as it also applies to a case where a cell region is determined based on a plurality of cell images based on other observation methods.

Although a final cell region is determined by obtaining a cell region for each of a plurality of cell images and then superimposing the plurality of cell regions in the above embodiment, a cell region also may be determined from a single composite image constituted by superimposing a plurality of cell images. In this case, the combining of a plurality of cell images is performed so that the cell images of the plurality of cell images appear to overlap. For example, when setting the transparency parameter of the first cell image to a semitransparent value and superimposing a semitransparent first cell image on the second cell image to synthesize a composite image, the cell image of the first cell image and the cell image of the second cell image appear to overlap in the composite image. The region of the cell can be determined by performing binarization processing or the like on this composite image.

What is claimed is:

1. A method comprising:
   obtaining a first cell image of a cell by a first observation method;
   obtaining a second cell image of the cell by a second observation method that is different from the first observation method; and
   determining a region of the cell based on the first cell image and the second cell image, wherein determining the region of the cell further comprises:
   determining a first cell region in the first cell image based on the first cell image;
   determining a second cell region in the second cell image based on the second cell image;
   generating a composite image by overlaying the first cell region and the second cell region;
   identifying a first noise region included in the first cell region based on the size of the region, and performing a first noise removal process to remove the first noise region from the first cell region; and
   identifying a second noise region included in the second cell region based on the size of the region, and performing a second noise removal process to remove the second noise region from the second cell region;
   the first cell region used to generate the composite image is a first cell region from which the first noise region has been removed; and
   the second cell region used to generate the composite image is a second cell region from which the second noise region has been removed.

2. The method of claim 1, wherein
   the second observation method is a dark field observation method; and
   the second cell image is a dark field image of the cell.

3. The method of claim 1, wherein
   the first observation method is a phase difference observation method; and
   the first cell image is a phase difference image of the cell.

4. The method of claim 2, wherein determining the second cell region comprises:
   in the dark field image, determining a region having a degree of brightness higher than a third threshold value.

5. The method of claim 1, wherein
   the first cell image and the second cell image are color images;
   the first noise removal process is respectively performed on the red image, green image, and blue image of the first cell image; and
   the second noise removal process is respectively performed on the red image, green image, and blue image of the second cell image.

6. The method of claim 1, wherein determining the region of a cell comprises:
   performing a hole fill-in process on the holes generated in the region of cells.

7. A method of claim 1, wherein the cell is an unstained cell.

8. A method of claim 1, wherein the cell is cell for transplantation.

9. A cell imaging system, comprising:
an imaging part configured to generate a first cell image by imaging a cell using a first observation method, and generate a second cell image by imaging the cell using a second observation method that is different from the first observation method; and
a processing part configured to execute image processing, wherein the image processing comprises:
obtaining the first cell image from the imaging part;
obtaining the second cell image from the imaging part; and
determining a region of the cell based on the first cell image and the second cell image, wherein determining the region of the cell further comprises:
determining a first cell region in the first cell image based on the first cell image;
determining a second cell region in the second cell image based on the second cell image;
generating a composite image by overlaying the first cell region and the second cell region;
identifying a first noise region included in the first cell region based on the size of the region, and performing a first noise removal process to remove the first noise region from the first cell region; and
identifying a second noise region included in the second cell region based on the size of the region, and performing a second noise removal process to remove the second noise region from the second cell region;
the first cell region used to generate the composite image is a first cell region from which the first noise region has been removed; and
the second cell region used to generate the composite image is a second cell region from which the second noise region has been removed.

10. The cell imaging system of claim 9, wherein the imaging part comprises:
a dark field observation optical system comprising an irradiation optical system configured to irradiate light toward the cell and an light receiving optical system configured to receive the scattered light from the cell to obtain a dark field image as the second cell image; and
an installation part in which to install the culture container of cells.

11. The cell imaging system of claim 10, wherein
the irradiation optical system is provided so as to irradiate light from the bottom surface side of the culture container installed in the installation part; and
the light receiving optical system is provided so as to receive the scattered light at the bottom surface side of the culture container installed in the installation part.

12. A processing apparatus comprising a processing part configured to execute processes of:
obtaining a first cell image of a cell by a first observation method;
obtaining a second cell image of the cell by a second observation method that is different from the first observation method; and
determining a region of the cell based on the first cell image and the second cell image, wherein determining the region of the cell further comprises:
determining a first cell region in the first cell image based on the first cell image;
determining a second cell region in the second cell image based on the second cell image;
generating a composite image by overlaying the first cell region and the second cell region;
identifying a first noise region included in the first cell region based on the size of the region, and performing a first noise removal process to remove the first noise region from the first cell region; and
identifying a second noise region included in the second cell region based on the size of the region, and performing a second noise removal process to remove the second noise region from the second cell region;
the first cell region used to generate the composite image is a first cell region from which the first noise region has been removed; and
the second cell region used to generate the composite image is a second cell region from which the second noise region has been removed.

13. The processing apparatus of claim 12, wherein
the first observation method is a phase difference observation method; and
the first cell image is a phase difference image of the cell.

14. The processing apparatus of claim 12, wherein
the second observation method is a dark field observation method; and
the second cell image is a dark field image of the cell.

15. The processing apparatus of claim 13, wherein determining the first cell region comprises:
in the phase difference image, determining a region having a degree of brightness higher than a first threshold value, and a region having a degree of brightness lower than a second threshold value that is less than the first threshold value as the first cell region.

16. The processing apparatus of claim 14, wherein determining the second cell region comprises:
in the dark field image, determining a region having a degree of brightness higher than a third threshold value.

17. The method of claim 3, wherein determining the first cell region comprises:
in the phase difference image, determining a region having a degree of brightness higher than a first threshold value, and a region having a degree of brightness lower than a second threshold value that is less than the first threshold value as the first cell region.

18. The cell imaging system of claim 10, wherein
the first observation method is a phase difference observation method; and
the first cell image is a phase difference image of the cell.

* * * * *